3,367,959
ESTERS OF AMIDOXIMES AND HYDROXAMIC ACIDS

Charles A. Fetscher, Short Hills, and Stanley A. Lipowski, Livingston, N.J., assignors to Diamond Shamrock Corporation, a corporation of Delaware
No Drawing. Filed Sept. 28, 1964, Ser. No. 399,841
14 Claims. (Cl. 260—482)

ABSTRACT OF THE DISCLOSURE

Amidoximes of the formula

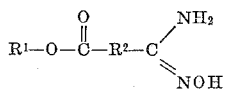

and hydroxamic acids of the formula

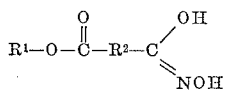

wherein $R^1$ is a monovalent hydrocarbon radical having 3 to 18 carbon atoms and $R^2$ is a divalent hydrocarbon radical having 1 to 3 carbon atoms which are chelators and which have improved solubility and compatibility in hydrocarbon solvents are provided. An amidoxime was prepared by reacting n-hexyl cyanoacetate with hydroxylamine and a hydroxamic acid was prepared by reacting dihexyl malonate with hydroxylamine.

---

The present invention relates to novel chelating materials. More particularly, the present invention relates to novel amidoximes and novel hydroxamic acids having the property of chelating heavy metals and further characterized by having outstanding and enhanced solubility and compatibility in the common aromatic and aliphatic hydrocarbon solvents.

Both the amidoxime and hydroxamic acid functional groups are known and are known to process the property of chelating heavy metals. These functional groups appear in both monomeric and polymeric materials. For example, monomeric amidoximes are disclosed in U.S. Patent No. 2,909,542, Soloway, Oct. 20, 1959, and polymeric forms are described in U.S. Patent Nos. 3,088,798 and 3,088,799, both to Fetscher, and both issued May 7, 1963, while monomeric hydroxamic acids are described in Chemical Reviews 33, p. 209, et seq. (1943), and U.S. Patent No. 2,279,973, Dietrich, Apr. 14, 1942. Note particularly page 241 of Chemical Reviews which refers to chelation with hydroxamic acid. The utilization of chelating agents to extract heavy metals is well known and the advantages accruing from such procedures are numerous. In this connection, reference is made to the disclosure of the aforesaid Fetscher patents. In many procedures it is desired to utilize hydrocarbon solutions of monomeric chelators in the extraction of metals from aqueous systems. One attempt to do this is set forth in U.S. Patent No. 2,909,542, Soloway, Oct. 20, 1959. According to this patent, fatty amidoximes of the formula,

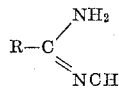

e.g., stearamidoxime, in a hydrocarbon medium are utilized to remove heavy metals from aqueous solutions. However, the poor solubility of fatty amidoximes in the hydrocarbon solvent makes their use in liquid extractions impractical. An improvement also described in this patent involves the introduction of oxygenated solvents such as alcohols, ketones and ethers in amounts of from 10% to 100%. Although solubility of the fatty amidoximes in the hydrocarbon is improved to some degree it still remains very low and in many instances, particularly in the recovery of metals from acid solutions, emulsions are formed which are hard or impossible to break. Stable emulsions are extremely undesirable when a clean, quick separation of phases is wanted. Further, these oxygenated solvents are not only much more expensive than hydrocarbon solvents, e.g., five to twenty times as expensive, but they are appreciably soluble in water. Thus in extraction of metals, appreciable losses of the oxygenated solvents are inevitable. Thus, even this embodiment does not make available to any practical extent the utilization of amidoximes in extraction processes. The prior art hydroxamic acids which were tested were found to be very limitedly soluble in hydrocarbon solvents.

Accordingly, it is an object of the present invention to provide for new and improved chelators having enhanced solubility and compatibility in hydrocarbon solvents. A further object of the present invention is to bring about new and improved chelators as well as a new and improved chelation process whereby chelating agents which are highly soluble in hydrocarbon solvents can be utilized. Other objects will become apparent from the detailed description given herein. It is intended, however, that the detailed description and specific examples do not limit the invention, but merely indicate embodiments thereof since various changes and modifications within the scope of the invention will become apparent to those skilled in the art.

We have unexpectedly discovered that the above as well as other objects can be achieved in the following manner. We have discovered a new and unique class of amidoximes and a new and unique glass of hydroxamic acids which have been found to be highly soluble and compatible in organic hydrocarbon solvents. This was most unexpected because both amidoximes and hydroxamic acids are highly polar materials and as stated previously are known to be difficultly soluble in hydrocarbon solvents. Our new amidoxime chelators have the following structure:

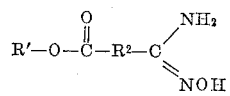

and our new hydroxamic acids have the following structure:

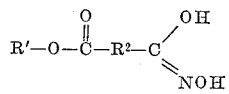

wherein in both of the above structures R' is a straight or chanched chain or cyclic monovalent hydrocarbon substituent having from 3 to 18, preferably 6 to 15, carbon atoms, with the proviso that the total number of carbon atoms in said structures does not exceed 21. Thus, R' can be propyl, isopropyl, butyl, isobutyl, amyl, isoamyl, hexyl, cyclohexyl, 2-ethyl hexyl, nonyl, decyl, n-decyl, dodecyl, tridecyl, oleyl and stearyl, while $R^2$ is a divalent hydrocarbon substituent having from 1 to 3 carbon atoms such as methylene (—$CH_2$—), ethylene (—$CH_2CH_2$—), propylene (—$CH_2CH_2CH_2$—) and isopropylene

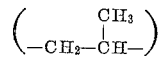

Although the art clearly teaches that highly polar materials such as amidoximes and hydroxamic acids are difficult to solubilize and are exceedingly incompatible in common hydrocarbon solvents, yet we have discovered that the foregoing amidoximes and hydroxamic acids are highly soluble and compatible in these common hydrocarbon solvents, even when present in amounts up to equal parts by weight of the solvent. Typical aromatic and aliphatic hydrocarbon solvents in which our novel compounds are soluble are hexane, heptane, octane, paraffin oil, mineral seal oil, white mineral oil, ligroin, gasolines, fuel oil, naphtha, naphthene, benzene, alkylated benzenes such as toluene and xylene, chlorinated hydrocarbons such as chloroform, carbon tetrachloride, chlorinated kerosene, chlorinated pentanes, monochlorbenzene, dichlorbenzene and mixtures thereof.

The amidoximes can be prepared by reacting the corresponding cyanoacetic ester, cyanopropionic ester or cyanobutyric ester with hydroxylamine. Hydroxylamine is obtained by liberation from its salt, e.g., hydroxylamine hydrochloride, with alkali. Generally, one mol of the corresponding cyanoacetic ester is reacted for 1 to 6 hours with from 1 to 2 mols of hydroxylamine at temperatures from about 30° C. to 70° C. and at a pH of from about 7 to 9. Exemplary of the amidoximes of the present invention are the following:

The hydroxamic acids of the present invention can be prepared in several ways. For instance, the amidoximes previously described can be hydrolyzed with water at temperatures of from −10° C. to +10° C. In concentrated mineral acid thereby converting the amidoxime to its corresponding hydroxamic acid. A preferred method, however, of preparing hydroxamic acids is to react a dimaloester, a disuccinoester or a diglutaroester with hydroxylamine, said esters containing the desired higher hydrocarbon radical. Generally, the corresponding diester is reacted with one mol of hydroxylamine for 2 to 6 hours at a pH of from 8 to 11 and from temperatures of 15° C. to 50° C. thereby forming the desired monohydroxamic acid. In the case of a dimaloester, the desired malonic diester can be easily made by transesterification of the commercially available diethyl malonate with an alcohol containing the desired higher hydrocarbon radical. Exemplary of the hydroxamic acids of the present invention are the following:

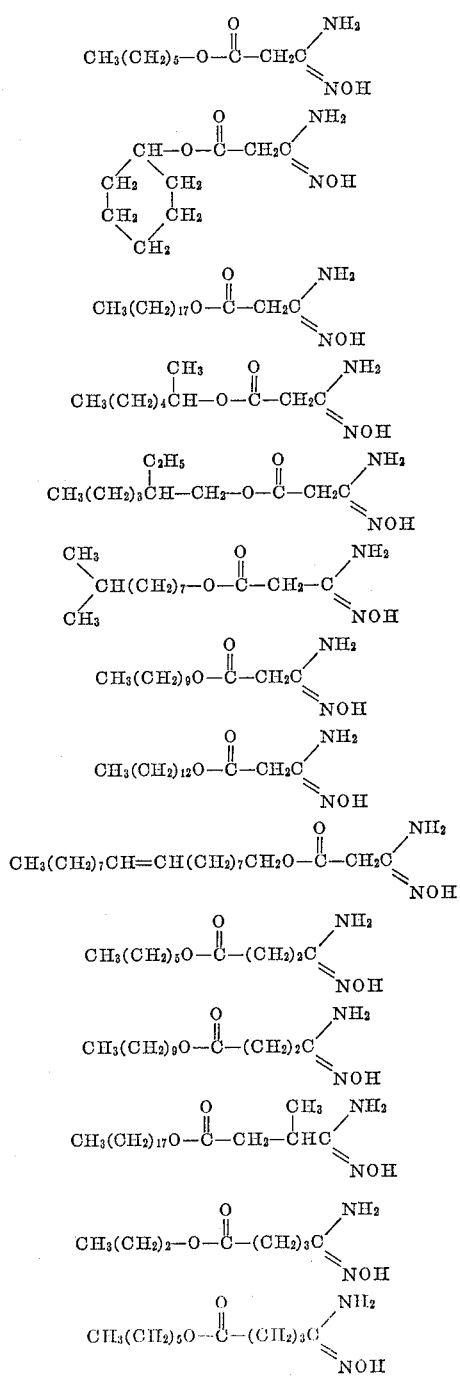

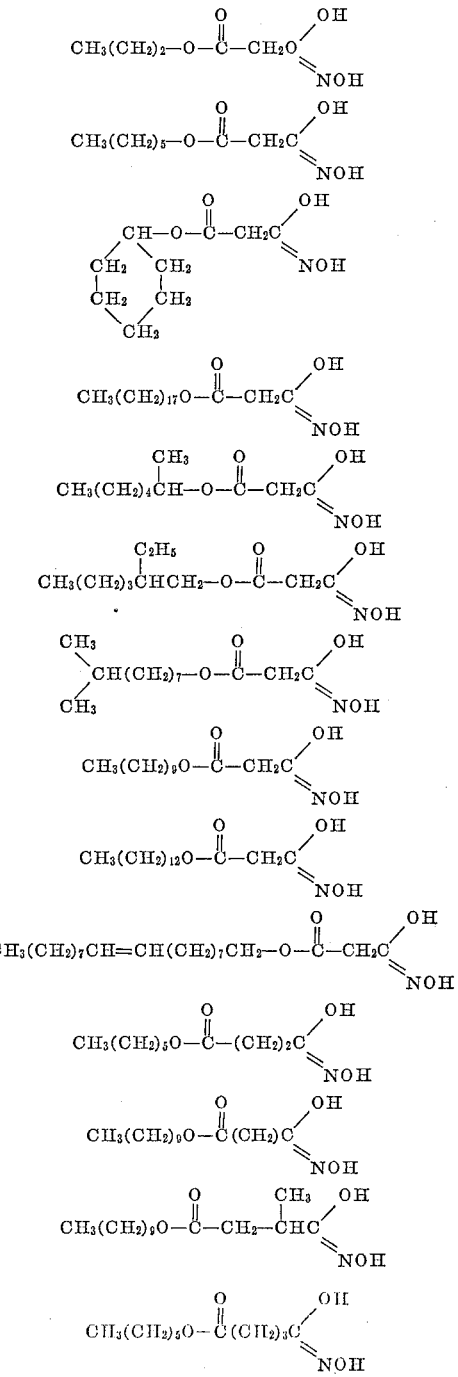

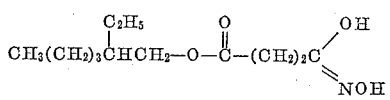

The foregoing amidoximes and hydroxamic acids have been found to chelate heavy metals including iron, cobalt, nickel, ruthenium, palladium, platinum, gold, uranium, copper, etc.

For a fuller understanding of the invention, reference may be had to the following examples which are given merely as further illustrations of the invention and are not to be construed in a limiting sense.

PREPARATION OF THE AMIDOXIMES

Example I 38.5 grams (0.55 mol) of hydroxylamine hydrochloride were dissolved in 220 cc. of boiling methanol. The solution was cooled down slowly to 40° C. 30.8 grams potassium hydroxide pellets (85.4% actual KOH content) were dissolved in 140 cc. methanol and the caustic solution cooled down to 20° C. Then the methanolic solution of potassium hydroxide was added to the hydroxylamine solution slowly under cooling, the temperature during the neutralization being not over 30° C. The neutralized hydroxylamine solution was cooled down to 5° C. and filtered through a Buchner funnel to remove the precipitated potassium chloride. The pH of the filtrate was 7.5. The filtrate was transferred to a reaction flask, 93 grams (0.5 mol) of n-hexyl cyanoacetate were added and the reaction flask heated to 40° C. This temperature was maintained for 3 hours. Thereafter most of the methanol was removed under vacuum, the temperature not being over 40° C. 500 cc. water were added and mixed with the residue thus forming a dark yellow oil layer and a water layer plus a precipitated white powder. The dark yellow oil layer was separated from the water layer and the precipitated white powder. The oil was dried over anhydrous sodium sulfate and filtered. The dark yellow oil after few hours standing, darkened to a clear brown oil which was the amidoxime from n-hexyl cyanoacetate. The yield was 64 grams equal to 63.3% of the theoretical yield. The total number of carbon atoms in the amidoxime is nine.

The following examples were carried out in the same manner as Example I above except for the changes indicated in the following table.

| Example | Mols of Hydroxylamine Solution | Ester | Mols of Ester | Total No. of C Atoms in Amidoxime | Yield (Percent) |
|---|---|---|---|---|---|
| II | 0.55 | Cyclohexyl cyanoacetate | 0.5 | 9 | 79.1 |
| III | 2.2 | 2-ethyl hexyl cyanoacetate | 2.0 | 11 | 82.6 |
| IV | 0.55 | Isodecyl cyanoacetate | 0.5 | 13 | 68.0 |
| V | 0.55 | n-Decyl cyanoacetate | 0.5 | 13 | 81.4 |
| VI | 0.55 | Tridecyl cyanoacetate | 0.5 | 16 | 84.0 |
| VII | 0.3 | Stearyl cyanoacetate | 0.2 | 21 | 66.1 |

PREPARATION OF THE HYDROXAMIC ACIDS

Example VIII.—Preparation of monohexyl malonate monohydroxamic acid

A. *Transesterification of diethyl malonate.*—To 80 grams (0.5 mol) of diethyl malonate were added 300 grams (about 3 mols) of n-hexanol and 20 grams of 98% sulfuric acid. The resulting mixture was refluxed for 4 hours at a reflux temperature of 112° C. The ethanol formed during the reaction was distilled off and the remaining reaction mixture which contained di n-hexyl malonate was transferred to a separatory funnel and washed with a 5% solution of sodium bicarbonate in water to a neutral reaction with methyl orange. The solution of di n-hexyl malonate in hexanol was dried with anhydrous sodium sulfate, then transferred to a flask and distilled under vacuum. The excess n-hexanol distilled over between 95° C.–105° C. at 28 inches vacuum. The di n-hexyl malonate distilled over at 185°–195° C. The yield was essentially quantitative.

B. *Conversion of di n-hexyl malonate to the corresponding monohydroxamic acid.*—128 grams (0.42 mol) of di n-hexyl malonate were mixed with 0.42 mol of a solution of hydroxlamine in methanol. This is enough hydroxylamine to replace one ester group of the diester. The hydroxylamine solution was prepared in the same manner as set forth in Example I above by neutralizing a methanolic solution of hydroxylamine hydrochloride with potassium hydroxide. 23.5 grams potassium hydroxide dissolved in 100 cc. methanol were added slowly during 40 minutes to the solution of di n-hexyl malonate and hydroxylamine. The temperature rose from 20° C. to 30° C. during the addition. Then the solution was stirred for three additional hours. Acetic acid was added to give a pH=7.0. The methanol was distilled off under vacuum and the remaining yellow oil filtered off from precipitated white solids and colored resinified materials. Yield was 75 grams of monohexyl malonate monohydroxamic acid which was 82% of the theoretical.

Example IX.—Preparation of mono 2-ethyl hexyl malonate monohydroxamic acid

A. *Transesterification of diethyl malonate.*—Di 2-ethyl hexyl malonate was prepared from 0.5 mol of diethyl malonate and 3 mols of 2-ethyl hexyl alcohol using the transesterification procedure of Example VIII A above. The reflux temperature was 114° C. for 4 hours. The excess alcohol distilled over at 100°–115° C. The ester distilled over at 200°–210° C.

B. *Conversion of di 2-ethyl hexyl malonate to the corresponding monohydroxamic acid.*—133 grams (0.37 mol) of di 2-ethyl hexyl malonate were reacted with hydroxylamine using the procedure of Example VIII B above. 86 grams of a lemon yellow colored oil were recovered which was mono 2-ethyl hexyl malonate monohydroxamic acid. This was 94% of the theoretical.

The hydroxamic acids prepared above when introduced into aqueous solutions of ferric salts as ferric chloride, give the typical cherry red color thus indicating the formation of a chelate with the ferric ion.

In order to demonstrate the superiority of the amidoximes of the present invention over the amidoximes described in U.S. Patent No. 2,909,542, Soloway), the following was carried out. First, five fatty amidoximes coming within the scope of the aforementioned patent were prepared as shown below.

A. *Lauroamidoxime.*—A one mol hydroxylamine solution in methanol was prepared. 98.5 grams (0.5 mol) of lauro nitrile was added and the mixture refluxed for 5 hours. One liter of water was added and the amidoxime precipitated from solution. The amidoxime was filtered off and dried under vacuum. The yield was about 90% of the theoretical. The amidoxime had a molecular weight of 181 and a total number of 12 carbon atoms.

The following examples were carried out in the same manner as Example A above except for the changes indicated in the following table.

| Example | Amidoxime Prepared | Nitrile Used | Total No. of Carbon Atoms in Amidoxime | Mol. Wt. | Mols of Nitrile Used | Mols of Hydroxyl Amine Used | Yield (Percent) |
|---|---|---|---|---|---|---|---|
| B | Valeroamidoxime | Valeronitrile | 5 | 83 | 0.25 | 0.5 | About 100. |
| C | Cocoamidoxime | Coconitrile | *12¾ | 190 | 0.5 | 1.0 | About 90. |
| D | Tallowamidoxime | Tallow nitrile | *17¼ | 254 | 0.5 | 1.0 | About 90. |
| E | Oleylamidoxime | Oleyl nitrile | 18 | 263 | 0.5 | 1.0 | About 90. |

*These are mixtures and the figure is an average.

*Example X.—Solubility determinations of fatty amidoximes*

The fatty amidoximes prepared according to the U.S. Patent No. 2,909,542 (Soloway) were tested for their solubility in aliphatic and aromatic hydrocarbons by two methods.

*Method A.*—Approximately 10 grams of each amidoxime prepared above was suspended in a weighed amount of test solvent, e.g., 250 to 300 grams, and shaken on a shaking machine for 2 hours. The mixture was filtered and the filtrate collected in a beaker tared on the analytical balance. The solvent was evaporated in the vacuum oven at the lowest possible temperature and the weight of residue was determined.

*Method B.*—For a check of the results obtained by Method A, solvent extracts of the amidoximes prepared the same way as described above were shaken with a strong copper sulfate solution for 24 hours, washed several times with water, and the amount of copper chelated determined spectophotometrically. From the molecular weights of the amidoximes and amount of copper chelated, the percentage of the dissolved amidoxime is easily calculated. The figures obtained by these two methods were in perfect agreement within analytical error. The second method was the only method used in determination of solubilities in mineral oils because of the high boiling points of the mineral oils. Evaporation of the mineral oil as called for in Method A would decompose the amidoxime dissolved therein. The following two examples illustrate the two methods as applied to lauroamidoxime.

EXAMPLE A 10.0 grams of lauroamidoxime were suspended in 300 grams of hexane and shaken for 2 hours on a shaking machine. The mixture was filtered and the filtrate weighed on a tared beaker. Exactly 250 grams of the filtrate were taken and transferred to a vacuum oven. The hexane was evaporated at a maximum temperature of 40° C. and under 29 inches vacuum. The beaker was then transferred to a desiccator, cooled to room temperature and weighed. The increase in weight over the tare was 20 mg. corresponding to 0.008% by weight of the total of amidoxime dissolved in hexane $$\left(\frac{0.02 \text{ g.} \times 100}{250 \text{ g.}} = 0.008\%\right)$$

EXAMPLE B

A solution of the lauroamidoxime was prepared the same way as in Example A. 250 grams of the solution were shaken for 24 hours with 100 cc. of a 5% aqueous copper sulfate solution. The two layers were separated and the hexane layer washed repeatedly with water. 5 cc. of the hexane solution of the copper complex were treated with 5 cc. concentrated hydrochloric acid and the eluted copper determined on the Bausch & Lomb Spectronic 20. The copper content of the 5 cc. sample was 57γ (0.057 mg.). This corresponds to a total of 2.85 mg. of copper present in the 250 gram sample of solution (50×0.057 mg.). The chelating capacity of the lauroamidoxime based on its molecular weight is 14.7% for copper, 2.85 mg. of copper correspond to 18.75 mg. of the amidoxime and a solubility of $$\frac{0.01875 \times 100}{250} = 0.0075\%$$

Thus, the results obtained by the two methods are very close.

The following sets forth the solubilities of fatty amidoximes coming within the scope of Patent No. 2,909,542 (Soloway) as determined by the foregoing methods. The percents are percents by weight of the solvents.

LAUROAMIDOXIME

| Solvent | Method A | Method B |
|---|---|---|
| Xylene | .007% | .007%. |
| Hexane | .008% | .0075%. |
| VM & P naphtha | .009% | .0085%. |
| White mineral oil | Not tested | .0065%. |

VALEROAMIDOXIME

| | | |
|---|---|---|
| Xylene | Below .005% | Below .005%. |
| Hexane | Below .005% | Below .005%. |
| VM & P naphtha | Below .005% | Below .005%. |
| White mineral oil | Not tested | Nil.* |

*No measurable copper.

COCOAMIDOXIME

| | | |
|---|---|---|
| Xylene | .024% | .027% |
| Hexane | .036% | .035%. |
| VM & P naphtha | .052% | .050%. |
| White mineral oil | Not tested | .015%. |

TALLOWAMIDOXIME

| | | |
|---|---|---|
| Xylene | .053% | .050%. |
| Hexane | .55% | .055%. |
| VM & P naphtha | .070% | .065%. |
| White mineral oil | Not tested | .025%. |

OLEYLAMIDOXIME

| | | |
|---|---|---|
| Xylene | 0.17% | 0.17%. |
| Hexane | 0.17% | 0.168%. |
| VM & P naphtha | 0.19% | 0.185%. |
| Mineral oil | Not tested | 0.095%. |

*Example XI.—Solubility determinations of amidoximes of the present invention*

The following demonstrates the enhanced solubility and compatibility of the amidoximes of the present invention. The amidoximes prepared from the following cyanoacetic esters:

n-hexyl cyanoacetate
   cyclohexyl cyanoacetate
   2-ethyl hexyl cyanoacetate
   isodecyl cyanoacetate
   n-decyl cyanoacetate
   tridecyl cyanoacetate
   stearyl cyanoacetate were each added to different portions of the following solvents in varying amounts of from 1% to 50% by weight of the solvent: hexane, heptane, octane, commercial gasoline, paraffin oil, mineral seal oil, kerosene, #2 fuel oil, benzene, xylene, toluene, chlorobenzene, o-dichlorobenzene, chloroform and carbon tetrachloride. These amidoximes were completely miscible with all of these solvents and even after standing for several days no separation of the amidoxime from the solvent occurred. In the case of the amidoxime prepared from stearyl cyanoacetate, although completely miscible with most of the chlorinated solvents this amidoxime was found to be soluble only to the extent of 25% by weight of the other hydrocarbons.

*Example III.—Solubility determinations of hydroxamic acids of the present invention*

The following demonstrates the enhanced solubility and compatibility of the hydroxamic acids of the present invention. Monohexyl malonate monohydroxamic acid and mono 2-ethyl hexyl malonate monohydroxamic acid were each added to different portions of the following solvents in varying amounts of from 1% to 50% by weight of the solvent: benzene, toluene, xylene, VM & P naphtha, hexane, and white mineral oil. These hydroxamic acids were completely soluble in these solvents and even after standing for several days, no separation of the hydroxamic acid from the solvent occurred.

*Example XIV*

The solubilities of laurohydroxamic acid and stearohydroxamic acid, both disclosed in U.S. Patent No. 2,279,973, Dietrich, Apr. 14, 1942, were determined in hexane, xylene, mineral oil and VM & P naphtha by the methods previously described for the amidoximes. The following table sets forth the solubilities observed in percent by weight of the total:

| Solvent | Laurohydroxamic acid | Stearylhydroxamic acid |
| --- | --- | --- |
| Hexane | 0.01% | 0.001% |
| Xylene | 0.05% | 0.05% |
| Mineral oil | 0.01% | 0.001% |
| VM & P naphtha | 0.01% | 0.002% |

Thus, it is clear that the amidoximes and hydroxamic acids of the present invention are vastly more soluble and compatible than those described in the aforementioned prior art, and as pointed out previously, in view of the polarity of these materials, this was most surprising. It certainly was most unexpected to discover that, for instance, the amidoxime from n-decyl cyanoacetate which has a total of 13 carbon atoms is over a thousand times as soluble in hexane as is cocoamidoxime which has a total of 12 to 13 carbon atoms, i.e., complete solubility up to 50% by weight of the solvent in the case of the former as compared to only 0.035% in the case of the latter. Thus, it is clear that the fatty amidoximes have no useful solubility in hydrocarbon solvents. Even the amidoxime from n-hexyl cyanoacetate having a total of only nine carbon atoms is completely miscible with the hydrocarbon solvents in contrast to the fatty amidoximes which have a greater chain length and which are only soluble in trace amounts as shown above. The same relationship also holds with respect to our hydroxamic acids. That is, our hydroxamic acids are far more soluble in hydrocarbon solvents than fatty hydroxamic acids of the same or greater chain length.

The chelating agents described herein are not only useful for liquid extraction of metals, but are also useful as metal deactivators, combustion improvers, corrosion inhibitors, and other types of oil and gasoline additives. All of these uses require concentrated solutions for convenient distribution throughout the bulk of the oil to be modified. For instance, it would be cumbersome to mix and dissolve one pound of chelator in 5000 gallons of oil. If it is possible to dissolve the pound of chelator in one gallon of oil, it is easy to mix this with the bulk. Therefore, the unexpected solubilities of the amidoximes and hydroxamic acids of the present invention render such applications operative whereas heretofor such applications could not be considered.

Having described our invention, what we claim as new and desire to secure by Letters Patent is:

1. A compound selected from the group consisting of

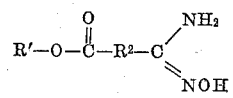

and

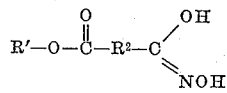

wherein R' is a monovalent hydrocarbon radical having from 3 to 18 carbon atoms and $R^2$ is a divalent hydrocarbon radical having from 1 to 3 carbon atoms with the proviso that the total number of carbon atoms in said compound does not exceed 21.

2. A compound selected from the group consisting of:

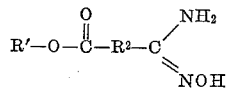

and

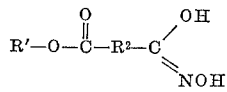

wherein R' is a monovalent hydrocarbon radical having from 6 to 15 carbon atoms and $R^2$ is a divalent hydrocarbon radical having from 1 to 3 carbon atoms.

3. A compound having the following formula:

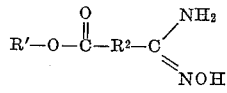

wherein R' is a monovalent hydrocarbon radical having from 3 to 18 carbon atoms and $R^2$ is a divalent hydrocarbon radical having from 1 to 3 carbon atoms with the proviso that the total number of carbon atoms in said compound does not exceed 21.

4. A compound having the following formula:

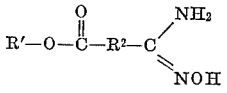

wherein R' is a monovalent hydrocarbon radical having from 6 to 15 carbon atoms and $R^2$ is a divalent hydrocarbon radical having from 1 to 3 carbon atoms.

5. A compound having the following formula:

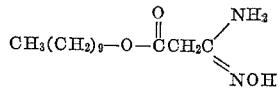

6. A compound having the following formula:

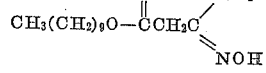

7. A compound having the following formula:

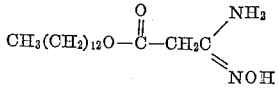

8. A compound having the following formula:

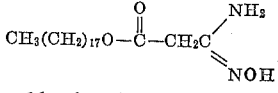

9. A compound having the following formula:

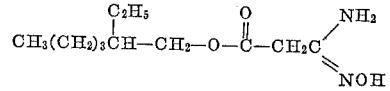

10. A compound having the following formula:

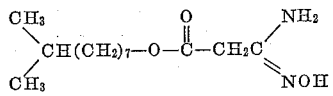

11. A compound having the following formula:

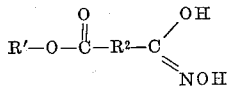

wherein R' is a monovalent hydrocarbon radical having from 3 to 18 carbon atoms and $R^2$ is a divalent hydrocarbon radical having from 1 to 3 carbon atoms with the proviso that the total number of carbon atoms in said compound does not exceed 21.

12. A compound having the following formula:

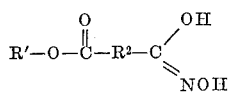

wherein R' is a monovalent hydrocarbon radical having 6 to 15 carbon atoms and $R^2$ is a divalent hydrocarbon radical having from 1 to 3 carbon atoms.

13. A compound having the following formula:

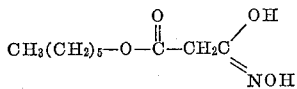

14. A compound having the following formula:

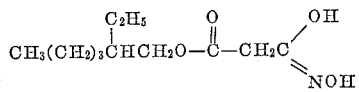

References Cited

UNITED STATES PATENTS

| | | | |
|---|---|---|---|
| 2,851,489 | 9/1958 | Godt | 260—534 |
| 2,387,323 | 10/1945 | Gaynor | 260—564 X |
| 2,909,542 | 10/1959 | Soloway | 260—429 |
| 3,076,026 | 1/1963 | White | 260—534 X |
| 3,088,798 | 5/1963 | Fetscher | 260—429 |
| 3,139,455 | 6/1964 | Campbell | 260—564 |
| 3,170,953 | 2/1965 | Lashna | 260—534 |
| 3,211,742 | 10/1965 | Lenaers | 260—482 X |
| 3,210,421 | 10/1965 | Rainer | 260—534 X |
| 3,215,730 | 11/1965 | Spathe et al. | 260—482 X |
| 3,166,470 | 1/1965 | Nagy | 260—482 X |

OTHER REFERENCES

Ungnade et al., J. Org. Chem., vol. 28, pp. 134–136 (1963), p. 135 relied on.

LORRAINE A. WEINBERGER, *Primary Examiner.*

RICHARD K. JACKSON, *Examiner.*

A. P. HALLUIM, *Assistant Examiner.*